(12) United States Patent
Shigematsu et al.

(10) Patent No.: US 7,483,115 B2
(45) Date of Patent: Jan. 27, 2009

(54) METHOD OF LASER PROCESSING A LIQUID CRYSTAL DEVICE WAFER

(75) Inventors: Koichi Shigematsu, Tokyo (JP); Satoshi Kobayashi, Tokyo (JP); Kiyoshi Ohsuga, Tokyo (JP)

(73) Assignee: Disco Corporation, Tokyo (JP)

( * ) Notice: Subject to any disclaimer, the term of this patent is extended or adjusted under 35 U.S.C. 154(b) by 367 days.

(21) Appl. No.: 11/499,688

(22) Filed: Aug. 7, 2006

(65) Prior Publication Data
US 2007/0035692 A1 Feb. 15, 2007

(30) Foreign Application Priority Data
Aug. 11, 2005 (JP) .............................. 2005-232838

(51) Int. Cl.
*G02F 1/13* (2006.01)
(52) U.S. Cl. ........................... 349/187; 349/189; 438/30
(58) Field of Classification Search ................. 349/187, 349/189; 438/30, 463; 219/121.72
See application file for complete search history.

(56) References Cited

U.S. PATENT DOCUMENTS

2004/0232124 A1* 11/2004 Nagai et al. ............ 219/121.72

FOREIGN PATENT DOCUMENTS

JP 3408805 3/2003

* cited by examiner

*Primary Examiner*—Brian Healy
*Assistant Examiner*—Michael P Mooney
(74) *Attorney, Agent, or Firm*—Smith, Gambrell & Russell, LLP (57) ABSTRACT

A method of laser processing a liquid crystal device wafer which is formed by laminating together a silicon substrate and a glass substrate, and has liquid crystal devices in respective rectangular areas sectioned by streets arranged in a lattice pattern on the front surface, the method comprising: a first deteriorated layer forming step for forming a deteriorated layer along the streets in the inside of the silicon substrate by applying a laser beam of a wavelength capable of passing through the silicone substrate and forming a deteriorated layer in the inside of the silicon substrate from the glass substrate side with its focal point set to the inside of the silicon substrate; and a second deteriorated layer forming step for forming a deteriorated layer along the streets in the inside of the glass substrate by applying a laser beam of a wavelength capable of passing through the glass substrate and forming a deteriorated layer in the inside of the glass substrate with its focal point set to the inside of the glass substrate.

10 Claims, 9 Drawing Sheets

METHOD OF LASER PROCESSING A LIQUID CRYSTAL DEVICE WAFER

FIELD OF THE INVENTION

The present invention relates to a method of laser processing a liquid crystal device wafer to form deteriorated layers along predetermined streets in the insides of a silicon substrate and a glass substrate constituting the liquid crystal device wafer.

DESCRIPTION OF THE PRIOR ART

A liquid crystal device wafer is formed by laminating together a silicon substrate and a glass substrate. In this liquid crystal device wafer, a plurality of rectangular areas are sectioned by cutting lines called "streets" arranged in a lattice pattern on one of the outer surfaces, and a liquid crystal device is formed in each of the rectangular areas. Individual liquid crystal devices are formed by dividing the liquid crystal device wafer having a plurality of liquid crystal devices, along the streets. The thus formed liquid crystal device has a liquid crystal injection port on one of its divided faces from which liquid crystal is injected into a liquid crystal chamber formed between the silicon substrate and the glass substrate to manufacture a liquid crystal device.

Since the above liquid crystal device wafer has injection ports for injecting liquid crystals, when it is cut along the streets by a cutting machine, cutting water enters the liquid crystal chambers from the injection ports to greatly reduce the quality of each liquid crystal device. Therefore, to divide the liquid crystal device wafer along the streets, division starting point grooves are formed by a dry tool such as a point scriber and external force is applied along the division starting point grooves to divide the liquid crystal device wafer into individual liquid crystal devices.

Meanwhile, as a means of dividing a plate-like workpiece such as a semiconductor wafer, for example, Japanese Patent No. 3408805 discloses a laser processing method for applying a pulse laser beam of a wavelength capable of passing through a workpiece to the workpiece with its focal point set to the inside of the area to be divided. In the dividing method making use of this laser processing technique, the workpiece is divided by applying a pulse laser beam capable of passing through the workpiece with its focal point set to the inside from one side of the workpiece to continuously form a deteriorated layer along the predetermined streets in the inside of the workpiece and by exerting external force along the streets whose strength has been reduced by the formation of the deteriorated layers.

The division starting point grooves must be formed on the outer surfaces of the silicon substrate and the glass substrate constituting the liquid crystal device wafer by a point scriber. Therefore, there is a problem that the liquid crystal device wafer must be reversed each time the division start point grooves are formed, thereby reducing the productivity. Further, there is another problem that since the division starting point grooves formed on the outer surfaces of the silicon substrate and the glass substrate have a small depth, even when external force is exerted along the division starting point grooves, the liquid crystal device wafer may not be divided along the division starting point grooves surely, thereby reducing the yield.

SUMMARY OF THE INVENTION

It is an object of the present invention to provide a method of laser processing a liquid crystal device wafer, capable of forming a deteriorated layer efficiently along predetermined streets in the insides of a silicon substrate and a glass substrates which constitute the liquid crystal device wafer by using the above laser processing technique.

To attain the above object, according to the present invention, there is provided a method of laser processing a liquid crystal device wafer which is formed by laminating together a silicon substrate and a glass substrate, and has liquid crystal chambers between the silicon substrate and the glass substrate, each of which being provided with a liquid crystal injection port communicating therewith, in rectangular areas sectioned by streets arranged in a lattice pattern on one of the outer surfaces and a plurality of drive electrodes arranged adjacent to each of the liquid crystal chambers on the silicon substrate, the method comprising the steps of:

a first deteriorated layer forming step for forming a deteriorated layer along the streets in the inside of the silicon substrate by applying a laser beam of a wavelength capable of passing through the silicone substrate and forming a deteriorated layer in the inside of the silicon substrate from the glass substrate side with its focal point set to the inside of the silicon substrate; and a second deteriorated layer forming step for forming a deteriorated layer along the streets in the inside of the glass substrate by applying a laser beam of a wavelength capable of passing through the glass substrate and forming a deteriorated layer in the inside of the glass substrate with its focal point set to the inside of the glass substrate.

Preferably, a transparent conductive film is formed on the inner surface of the glass substrate and the laser beam is applied so as not to laser process the areas, at which the liquid crystal injection ports are formed, of the transparent conductive film in the second deteriorated layer forming step. The application of the laser beam is stopped at positions where the liquid crystal injection ports are formed, in the second deteriorated layer forming step. Further, a plurality of deteriorated layers are formed in the thickness direction of the glass substrate and the application of the laser beam is stopped at positions where the liquid crystal injection ports are formed when the deteriorated layers are to be formed at positions near the liquid crystal injection ports in the second deteriorated layer forming step. The output of the laser beam is reduced at positions where the liquid crystal injection ports are formed in the second deteriorated layer forming step.

A break line for breaking a portion corresponding to the plurality of drive electrodes is formed on the outer surface of the glass substrate, and a third deteriorated layer forming step is carried out to form a deteriorated layer along the break line in the inside of the glass substrate by applying a laser beam of a wavelength capable of passing through the glass substrate and forming a deteriorated layer in the inside of the glass substrate along the break line with its focal point set to the inside of the glass substrate. The laser beam is applied so as not to break the plurality of drive electrodes in the third deteriorated layer forming step. The application of the laser beam is stopped at positions where the plurality of drive electrodes are formed in the third deteriorated layer forming step. A plurality of deteriorated layers are formed in the thickness direction of the glass substrate and the application of the laser beam is stopped at positions where the plurality of drive electrodes are formed when the deteriorated layers are to be formed at positions near the plurality of drive electrodes in the third deteriorated layer forming step. The output of the laser beam is reduced at positions where the plurality of drive electrodes are formed in the third deteriorated layer forming step.

In the present invention, since the pulse laser beam is applied from the glass substrate side in the first deteriorated layer forming step and the second deteriorated layer forming step, deteriorated layers can be formed along the predetermined streets efficiently in the insides of the silicon substrate and the glass substrate without necessity of reversing the liquid crystal device wafer. Further, in the present invention, since the strength of the liquid crystal device wafer has been reduced by the formation of the deteriorated layers along the streets in the insides of the silicon substrate and the glass substrate constituting the liquid crystal device wafer, the liquid crystal device wafer can be easily and surely divided along the streets by applying external force.

DETAILED DESCRIPTION OF THE PREFERRED EMBODIMENTS

Preferred embodiments of the method of laser processing a liquid crystal device wafer according to the present invention will be described in detail hereinunder with reference to the accompanying drawings.

Figure 1:
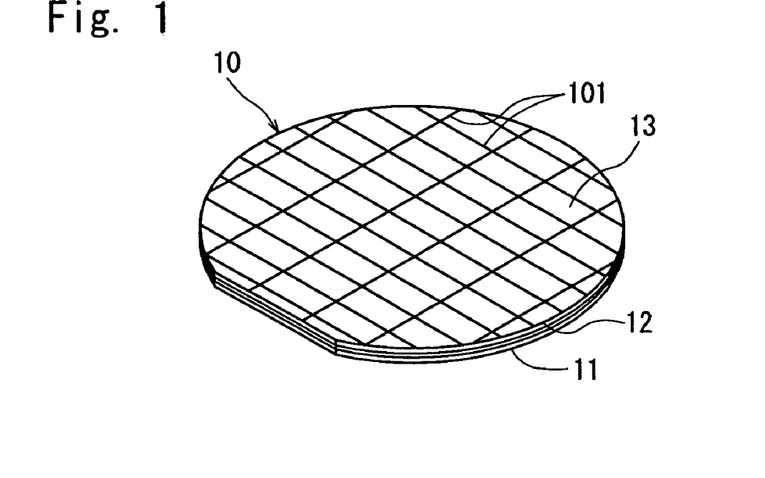
FIG. 1 is a perspective view of a liquid crystal device wafer to be processed by the method of laser processing a liquid crystal device wafer according to the present invention.
Figure 2:
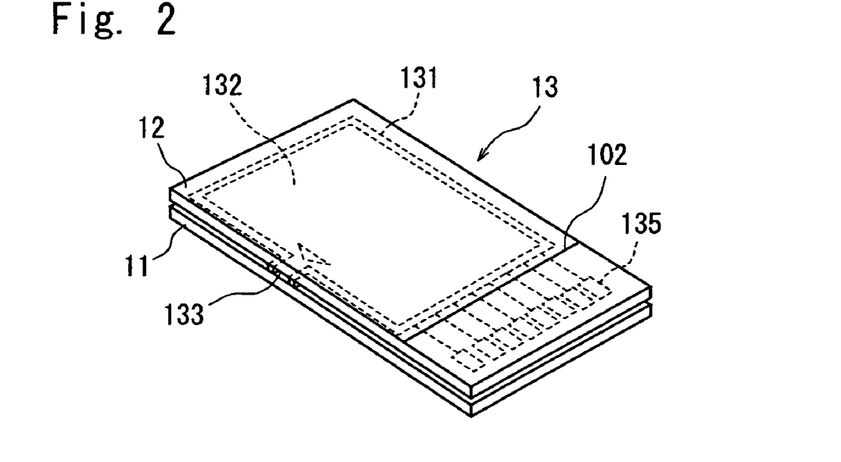
FIG. 2 is a perspective view of a liquid crystal device formed in the liquid crystal device wafer shown in FIG. 1.
Figure 3:
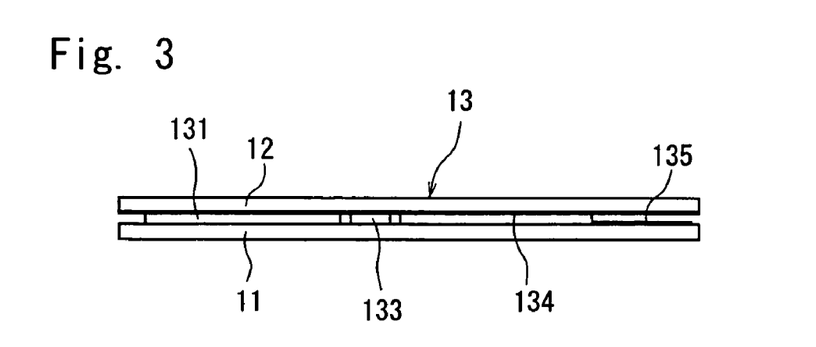
FIG. 3 is a side view of the liquid crystal device shown in FIG. 2.

FIG. 1 is a perspective view of a liquid crystal device wafer to be processed by the method of laser processing a liquid crystal device wafer according to the present invention. The liquid crystal device wafer 10 shown in FIG. 1 comprises a silicon substrate 11 and a glass substrate 12 which are spaced apart from each other at a predetermined interval (1 to 3 μm), and a plurality of streets 101 are formed in a lattice pattern on the outer surface of the glass substrate 12. Liquid crystal devices 13 are formed in areas sectioned by the plurality of streets 101. The liquid crystal device 13 has a liquid crystal chamber 132 sectioned by a sealant 131 between the silicon substrate 11 and the glass substrate 12, as shown in FIG. 2 and FIG. 3. The sealant has a liquid crystal injection port 133 which is open to one of the end faces of the liquid crystal device 13 and communicates with the liquid crystal chamber 132. A transparent conductive film 134 made of indium oxide-tin is formed on the inner surface, that is, the surface on the liquid crystal chamber 132 side of the glass substrate 12 by vapor deposition. A plurality of drive electrodes 135 adjacent to the sealant 131 for sectioning the liquid crystal chamber 132 are formed on the inner surface, that is, the surface on the liquid crystal chamber 132 side of the silicon substrate 11 constituting the liquid crystal device 13. A break line 102 for breaking a portion corresponding to the drive electrodes 135, as shown in FIG. 2, is formed on the outer surface of the glass substrate 12.

Figure 4:
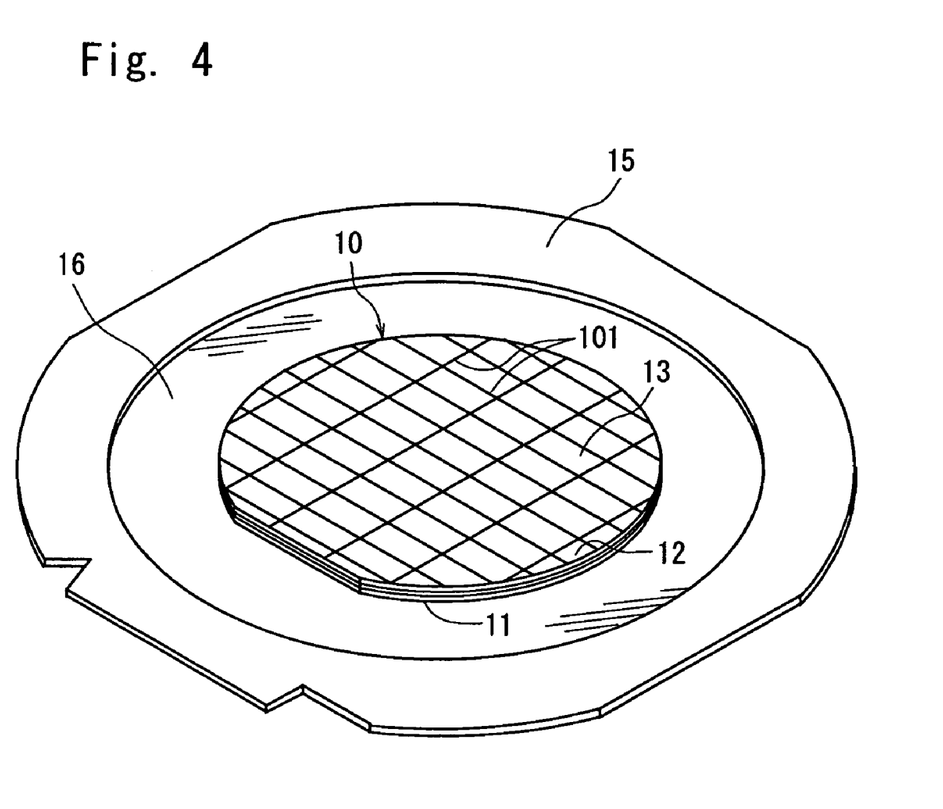
FIG. 4 is a perspective view showing a state of the liquid crystal device wafer shown in FIG. 1, put on a support tape mounted on an annular frame.

In order to carry out laser processing for forming a deteriorated layer along the streets 101 in the insides of the silicon substrate 11 and the glass substrate 12 constituting the above liquid crystal device wafer 10, as shown in FIG. 4, the silicon substrate 11 is put on the surface of a support tape 16 composed of a synthetic resin sheet such as a polyolefin sheet mounted on an annular frame 15. Therefore, the glass substrate 12 of the liquid crystal device wafer 10 faces up.

A description will be subsequently given of the laser processing method for forming a deteriorated layer in the insides of the silicon substrate 11 and the glass substrate 12 by applying a laser beam along the streets 101 on the glass substrate 12 constituting the liquid crystal device wafer 10.

A laser beam processing machine for applying a laser beam to the silicon substrate 11 and the glass substrate 12 constituting the liquid crystal device wafer 10 along the streets will be described with reference to FIG. 5.

Figure 5:
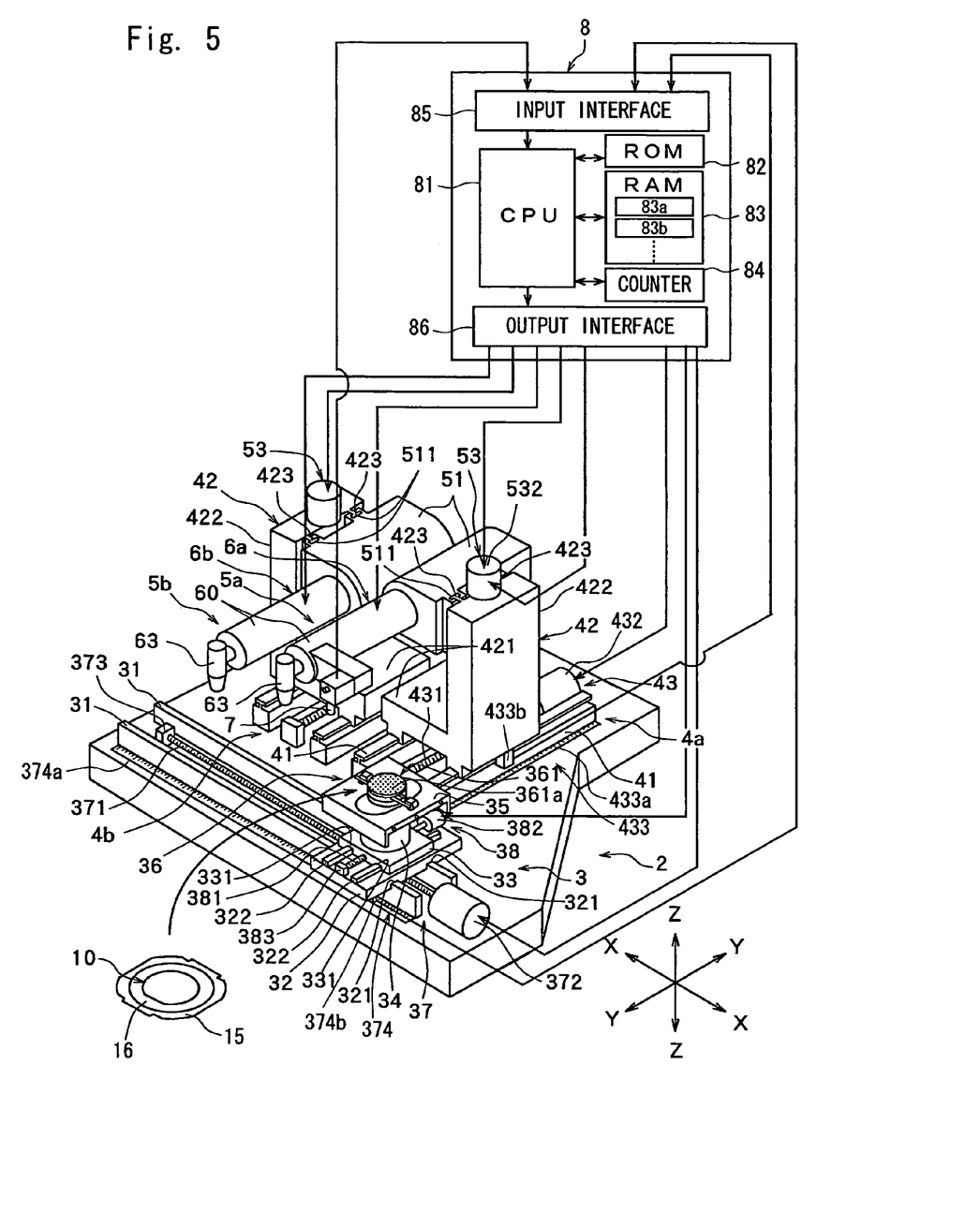
FIG. 5 is a perspective view of a laser beam processing machine for carrying out the method of laser processing a liquid crystal device wafer according to the present invention.

The laser beam processing machine 1 shown in FIG. 5 comprises a stationary base 2, a chuck table mechanism 3 for holding a workpiece, which is mounted on the stationary base 2 in such a manner that it can move in a processing-feed direction indicated by an arrow X, a first laser beam application unit support mechanism 4a mounted on the stationary base 2 in such a manner that it can move in an indexing-feed direction indicated by an arrow Y perpendicular to the processing-feed direction indicated by the arrow X, a first laser beam application unit 5a mounted to the first laser beam application unit support mechanism 4a in such a manner that it can move in a direction indicated by an arrow Z, a second laser beam application unit support mechanism 4b, and a second laser beam application unit 5b mounted on the second laser beam application unit support mechanism 4b in such a manner that it can move in the direction indicated by the arrow Z.

The above chuck table mechanism 3 comprises a pair of guide rails 31 and 31 which are mounted on the stationary base 2 and arranged parallel to each other in the processing-feed direction indicated by the arrow X, a first sliding block 32 mounted on the guide rails 31 and 31 in such a manner that it can move in the direction indicated by the arrow X, a second sliding block 33 mounted on the first sliding block 32 in such a manner that it can move in the indexing-feed direction indicated by the arrow Y, a support table 35 supported on the second sliding block 33 by a cylindrical member 34, and a chuck table 36 as a workpiece holding means. This chuck table 36 has an adsorption chuck 361 made of a porous material so that the above liquid crystal device wafer 10 as a workpiece is held on the workpiece placing surface 361a of the adsorption chuck 361 by a suction means that is not shown. The chuck table 36 is rotated by a pulse motor (not shown) installed in the cylindrical member 34.

The above first sliding block 32 has, on its undersurface, a pair of to-be-guided grooves 321 and 321 to be fitted to the above pair of guide rails 31 and 31 and, on its top surface, a pair of guide rails 322 and 322 formed parallel to each other in the indexing-feed direction indicated by the arrow Y. The first sliding block 32 constituted as described above can move along the pair of guide rails 31 and 31 in the processing-feed direction indicated by the arrow X by fitting the to-be-guided grooves 321 and 321 to the pair of guide rails 31 and 31, respectively. The chuck table mechanism 3 in the illustrated embodiment comprises a processing-processing-feed means 37 for moving the first sliding block 32 along the pair of guide rails 31 and 31 in the processing-feed direction indicated by the arrow X. The processing-feed means 37 comprises a male screw rod 371 that is arranged between the above pair of guide rails 31 and 31 parallel thereto and a drive source such as a pulse motor 372 for rotary-driving the male screw rod 371. The male screw rod 371 is, at its one end, rotatably supported to a bearing block 373 fixed on the above stationary base 2 and, at the other end, transmission-coupled to the output shaft of the above pulse motor 372. The male screw rod 371 is screwed into a threaded through-hole formed in a female screw block (not shown) projecting from the undersurface of the center portion of the first sliding block 32. Therefore, by driving the male screw rod 371 in a normal direction or reverse direction with the pulse motor 372, the first sliding block 32 is moved along the guide rails 31 and 31 in the processing-feed direction indicated by the arrow X.

The laser beam processing machine 1 in the illustrated embodiment comprises a processing-feed amount detection means 374 for detecting the processing-feed amount of the above chuck table 36. The processing-feed amount detection means 374 comprises a linear scale 374a arranged along the guide rail 31 and a read head 374b which is mounted on the first sliding block 32 to move along the linear scale 374a together with the first sliding block 32. The read head 374b of this processing-feed amount detection means 374 supplies one pulse signal for every 0.1 μm to a control means which will be described later in the illustrated embodiment. The control means described later counts the input pulse signals to detect the processing-feed amount of the chuck table 36. When the pulse motor 372 is used as a drive source for the above processing-feed means 37, the processing-feed amount of the chuck table 36 can be detected by counting the drive pulses of the control means described later for outputting a drive signal to the pulse motor 372. When a servo motor is used as a drive source for the above processing-feed means 37, the processing-feed amount of the chuck table 36 can be detected by sending pulse signals output from a rotary encoder for detecting the revolution of the servo motor and counting the pulse signals input into the control means.

The above second sliding block 33 has, on its undersurface, a pair of to-be-guided grooves 331 and 331 to be fitted to the pair of guide rails 322 and 322 formed on the top surface of the above first sliding block 32 and is so constituted as to move in the indexing-feed direction indicated by the arrow Y by fitting the to-be-guided grooves 331 and 331 to the pair of guide rails 322 and 322, respectively. The chuck table mechanism 3 in the illustrated embodiment comprises a first indexing-feed means 38 for moving the second sliding block 33 along the pair of guide rails 322 and 322 on the first sliding block 32 in the indexing-feed direction indicated by the arrow Y. The first indexing-feed means 38 has a male screw rod 381 which is arranged between the above pair of guide rails 322 and 322 parallel thereto and a drive source such as a pulse motor 382 for rotary-driving the male screw rod 381. The male screw rod 381 is, at its one end, rotatably supported to a bearing block 383 fixed on the top surface of the above first sliding block 32 and is, at the other end, transmission-coupled to the output shaft of the above pulse motor 382. The male screw rod 381 is screwed into a threaded through-hole formed in a female screw block. (not shown) projecting from the undersurface of the center portion of the second sliding block 33. Therefore, by driving the male screw rod 381 in a normal direction or reverse direction with the pulse motor 382, the second sliding block 33 is moved along the guide rails 322 and 322 in the indexing-feed direction indicated by the arrow Y.

The above first laser beam application unit support mechanism 4a has a pair of guide rails 41 and 41 mounted on the stationary base 2 and arranged parallel to each other in the indexing-feed direction indicated by the arrow Y and a movable support base 42 mounted on the guide rails 41 and 41 in such a manner that it can move in the indexing-feed direction indicated by the arrow Y. This movable support base 42 consists of a movable support portion 421 movably mounted on the guide rails 41 and 41 and a mounting portion 422 mounted on the movable support portion 421. The mounting portion 422 is provided with a pair of guide rails 423 and 423 extending parallel to each other in the direction indicated by the arrow Z, that is, a direction perpendicular to the workpiece placing surface 361a of the above chuck table 36 on one of its flanks. The first laser beam application unit support mechanism 4a in the illustrated embodiment has a second indexing-feed means 43 for moving the movable support base 42 along the pair of guide rails 41 and 41 in the indexing-feed direction indicated by the arrow Y. This second indexing-feed means 43 has a male screw rod 431 that is arranged between the above pair of guide rails 41 and 41 parallel thereto and a drive source such as a pulse motor 432 for rotary-driving the male screw rod 431. The male screw rod 431 is, at its one end, rotatably supported to a bearing block (not shown) fixed on the above stationary base 2 and is, at the other end, transmission-coupled to the output shaft of the above pulse motor 432. The male screw rod 431 is screwed into a threaded through-hole formed in a female screw block (not shown) projecting from the undersurface of the center portion of the movable support portion 421 constituting the movable support base 42. Therefore, by driving the male screw rod 431 in a normal direction or reverse direction with the pulse motor 432, the movable support base 42 is moved along the guide rails 41 and 41 in the indexing-feed direction indicated by the arrow Y.

The laser beam processing machine 1 in the illustrated embodiment has an indexing-feed amount detection means 433 for detecting the indexing-feed amount of the movable support base 42 of the above first laser beam application unit support mechanism 4a. This indexing-feed amount detection means 433 comprises a linear scale 433a arranged along the guide rail 41 and a read head 433b which is mounted on the movable support base 42 to move along the linear scale 433a. The read head 433b of the indexing-feed amount detection means 433 supplies one pulse signal for every 1 μm to the control means later-described in the illustrated embodiment. The control means later-described counts the input pulse signals to detect the indexing-feed amount of the first laser beam application unit 5a. When the pulse motor 432 is used as a drive source for the above second indexing-feed means 43, the indexing-feed amount of the first laser beam application unit 5a can be detected by counting the drive pulses of the control means for outputting a drive signal to the pulse motor 432. When a servo motor is used as a drive source for the above second indexing-feed means 43, the indexing-feed amount of the first laser beam application unit 5a can be detected by sending pulse signals output from a rotary encoder for detecting the revolution of the servo motor to the control means later-described and counting pulse signals input into the control means.

The first laser beam application unit 5a in the illustrated embodiment has a unit holder 51 and a first laser beam application means 6a secured to the unit holder 51. The unit holder 51 has a pair of to-be-guided grooves 511 and 511 to be slidably fitted to the pair of guide rails 423 and 423 on the above mounting portion 422 and is supported in such a manner that it can move in the direction indicated by the arrow Z by fitting the to-be-guided grooves 511 and 511 to the above guide rails 423 and 423, respectively. The first laser beam application unit 5a in the illustrated embodiment comprises a focal point position adjusting means 53 for moving the unit holder 51 along the pair of guide rails 423 and 423 in the direction indicated by the arrow Z. The focal point position adjusting means 53 comprises a male screw rod (not shown) arranged between the above pair of guide rails 423 and 423 and a drive source such as a pulse motor 532 for rotary-driving the male screw rod. By driving the male screw rod (not shown) in a normal direction or reverse direction with the pulse motor 532, the unit holder 51 and the first laser beam application means 6a are moved along the guide rails 423 and 423 in the direction indicated by the arrow Z.

The first laser beam application means 6a comprises a cylindrical casing 60 that is secured to the above unit holder 51 and extends substantially horizontally. In the casing 60, there is installed a pulse laser beam oscillation means comprising a pulse laser beam oscillator composed of a YAG laser oscillator or YVO4 laser oscillator and a repetition frequency setting means. The pulse laser beam oscillation means oscillates a pulse laser beam of a wavelength of 1,064 nm, which has permeability for the silicon substrate and is capable of forming a deteriorated laser in the inside of the silicon substrate. A condenser 63 housing condensing lenses (not shown) constituted by a combination of lenses that may be formation known per se is attached to the end of the above casing 60. A laser beam oscillated from the above pulse laser beam oscillation means reaches the condenser 63 through a transmission optical system (not shown) and is applied from the condenser 63 to the workpiece held on the above chuck table 36 at a predetermined focal spot diameter.

An image pick-up means 7 is attached to the front end portion of the casing 60 constituting the above first laser beam application means 6a. This image pick-up means 7 comprises an illuminating means for illuminating the workpiece, an optical system for capturing the area illuminated by the illuminating means, and an image pick-up device (CCD) for picking up an image captured by the optical system and supplies the obtained image data to the control means later-described.

A description will be subsequently given of the above second laser beam application unit support mechanism 4b and the second laser beam application unit 5b. As for the second laser beam application unit support mechanism 4b and the second laser beam application unit 5b, the same reference symbols are given to constituent members having substantially the same functions as the constituent members of the above first laser beam application unit support mechanism 4a and the first laser beam application unit 5a.

The second laser beam application unit support mechanism 4b is arranged parallel to the above first laser beam application unit support mechanism 4a, and the movable support base 42 of the second laser beam application unit support mechanism 4b is opposed to the movable support base 42 of the above first laser beam application unit support mechanism 4a. Therefore, the first laser beam application unit 5a mounted on the mounting portion 422 constituting the movable support base 42 of the above first laser beam application unit support mechanism 4a and the second laser beam application unit 5b mounted on a mounting portion 422 constituting the movable support base 42 of the second laser beam application unit support mechanism 4b are arranged such that they are linearly symmetrical to each other at positions close to each other. No image pick-up means is mounted to the front end portion of a casing 60 constituting the second laser beam application means 6b of the second laser beam application unit 5b.

The second laser beam application means 6b comprises the cylindrical casing 60 that is secured to a unit holder 51 and extends substantially horizontally. In the casing 60, there is installed a pulse laser beam oscillation means comprising a pulse laser beam oscillator composed of a YAG laser oscillator or YVO4 laser oscillator and a repetition frequency setting means. The pulse laser beam oscillation means oscillates a pulse laser beam of a wavelength of 355 nm, which has permeability for the glass substrate and is capable of forming a deteriorated laser in the inside of the glass substrate. A condenser 63 housing condensing lenses (not shown) constituted by a combination of lenses that may be formation known per se is attached to the end of the above casing 60. A laser beam oscillated from the above pulse laser beam oscillation means reaches the condenser 63 through a transmission optical system (not shown) and is applied from the condenser 63 to the workpiece held on the above chuck table 36 at a predetermined focal spot diameter.

The laser beam processing machine 1 in the illustrated embodiment comprises a control means 8. The control means 8 is constituted by a computer which comprises a central processing unit (CPU) 81 for carrying out arithmetic processing based on a control program, a read-only memory (ROM) 82 for storing the control program, etc., a read/write random access memory (RAM) 83 for storing data on the design values of the workpiece and the results of operations both of which will be described later, a counter 84, an input interface 85 and an output interface 86. Detection signals from the above processing-feed amount detection means 374, the indexing-feed amount detection means 433, the image pick-up means 7, etc. are input to the input interface 85 of the control means 8. Control signals are output from the output interface 86 of the control means 8 to the above pulse motor 372, the pulse motor 382, the pulse motor 432, the pulse motor 532, the first laser beam application means 6a, the second laser beam application means 6b, etc. The above random access memory (RAM) 83 has a first storage area 83a for storing design data on the positions of the liquid crystal injection ports 133 of the above liquid crystal device wafer 10, a second storage area 83b for storing design data on the positions of the drive electrodes 135 of the liquid crystal device wafer 10, and other storage area.

A description is subsequently given of the laser processing method for forming a deteriorated layer along the streets 101 in the silicon substrate 11 and the glass substrate 12 constituting the liquid crystal device wafer 10 by using the above-described laser beam processing machine 1.

The liquid crystal device wafer 10 supported to the annular frame 15 through the support tape 16 as described above is conveyed to the top of the adsorption chuck 361 of the chuck table 36 constituting the above chuck table mechanism 3 by a workpiece conveying means (not shown) and suction-held on the adsorption chuck 361 as shown in FIG. 5. The chuck table 36 thus suction-holding the liquid crystal device wafer 10 is moved along the guide rails 31 and 31 by the operation of the processing-feed means 37 to be brought to a position right below the image pick-up means 7 mounted on the first laser beam application unit 5a.

After the chuck table 46 is positioned right below the image pick-up means 7 as described above, the image pick-up means 7 and the control means carry out image processing such as pattern matching, etc. to align a street 101 formed in a predetermined direction of the liquid crystal device wafer 10 with the condenser 63 of the first laser beam application means 6a and the condenser 63 of the second laser beam application means 6b, thereby performing the alignment of a laser beam application position. Further, the alignment of the laser beam application position is also carried out on streets 101 formed on the liquid crystal device wafer 10 in a direction perpendicular to the above predetermined direction. Further, the alignment of the laser beam application position is also carried out on the break lines 102 formed on the outer surface of the glass substrate 12.

Figure 6:
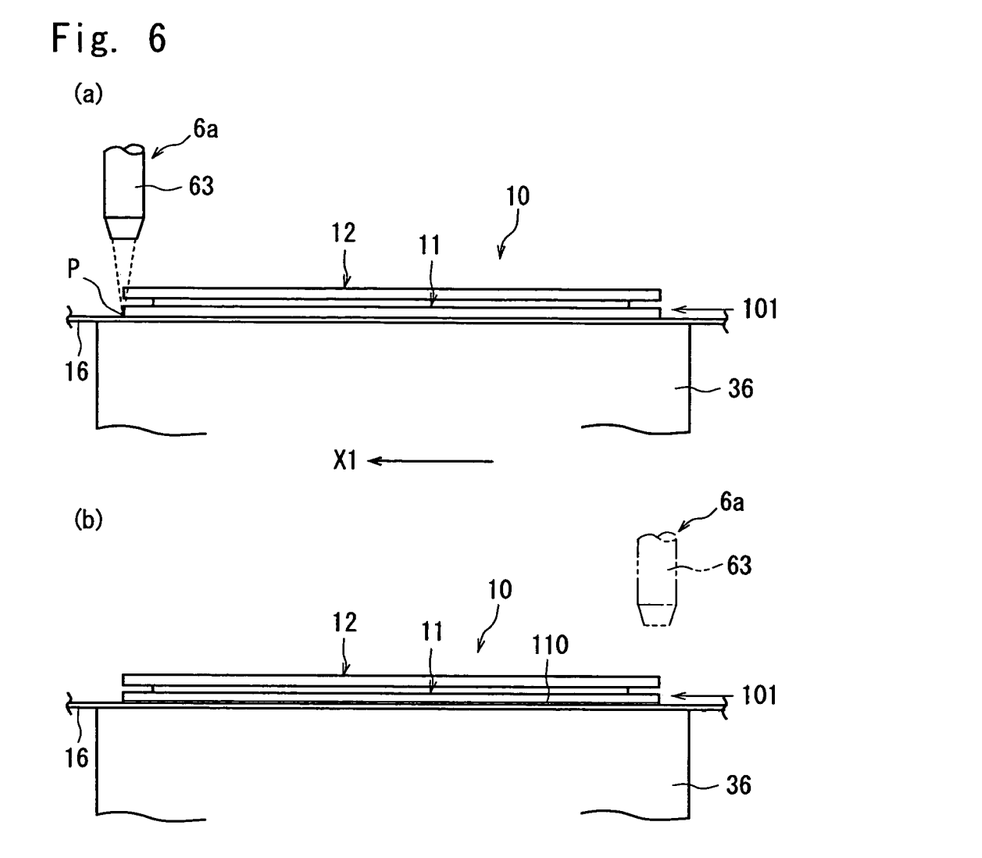
FIGS. 6(a) and 6(b) are explanatory diagrams showing the first deteriorated layer forming step in the method of laser processing a liquid crystal device wafer according to the present invention.

After the street 101 formed on the liquid crystal device wafer 10 held on the chuck table 36 is detected and the alignment of the laser beam application position is carried out as described above, next comes a first deteriorated layer forming step for forming a deteriorated layer along the street 101 in the inside of the silicon substrate 11 by applying a laser beam of a wavelength capable of passing through the silicon substrate 11 from the glass substrate 12 side along the street 101 with its focal point set to the inside of the silicon substrate 11. In this first deteriorated layer forming step, the chuck table 36 is moved to a laser beam application area where the condenser 63 of the first laser beam application means 6a for applying a pulse laser beam is located so as to bring one end (left end in FIG. 6(a)) of the predetermined street 101 to a position right below the condenser 63 of the first laser beam application means 6a, as shown in FIG. 6(a). The chuck table 36, that is, the liquid crystal device wafer 10 is then caused to move in the direction indicated by the arrow X1 in FIG. 6(a) at a predetermined feed rate while a pulse laser beam of a wavelength of 1,064 nm capable of passing through the silicon substrate 11 and capable of forming a deteriorated layer in the inside of the silicon substrate is applied from the condenser 63 from the glass substrate 12 side. Then, when the other end of the street 101 reaches the application position of the condenser 63 of the first laser beam application means 6a as shown in FIG. 6(b), the application of the pulse laser beam is suspended, and the movement of the chuck table 36, that is, the liquid crystal device wafer 10 is stopped. In this step of laser processing the silicon substrate 11, the focal point P of the pulse laser beam is set to a position near the outer surface (undersurface) of the silicon substrate 11 so that the deteriorated layer 110 is exposed to the outer surface (undersurface) and formed inward. This deteriorated layer 110 is formed as a molten and re-solidified layer. Since the glass substrate 12 transmits a laser beam having a wider range of wavelength than the silicon substrate 11, and the wavelength of the pulse laser beam applied in the first deteriorated layer forming step is set to 1,064 nm capable of passing through the silicon substrate 11, the pulse laser beam is applied through the glass substrate 12.

The processing conditions in the above first deteriorated layer forming step are set as follows, for example.

Figure 7:
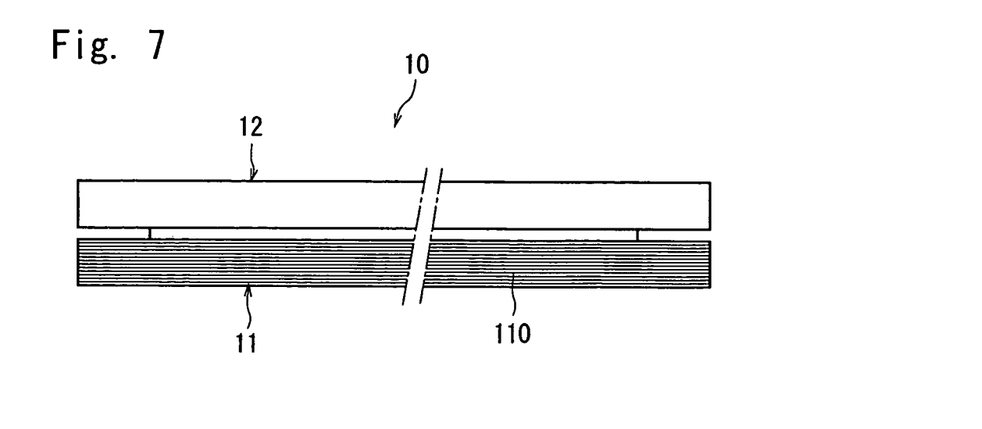
FIG. 7 is an explanatory diagram showing a state where a plurality of deteriorated layers are formed in a silicon substrate constituting the liquid crystal device wafer.

Light source: LD excited Q switch Nd:YVO4 laser
Wavelength: pulse laser beam having a wavelength of 1,064 nm
Repetition frequency: 100 to 400 kHz
Average output: 1 to 5 W
Focal spot diameter: 1 to 50 μm
Processing-feed rate: 100 to 800 mm/sec When the silicon substrate 11 is thick, the above first deteriorated layer forming step is carried out a plurality of times by changing the focal point stepwise as shown in FIG. 7 to form a plurality of deteriorated layers 110. Though the deteriorated layer 110 may be formed from the outer surface to the inner surface (from the undersurface to the top surface) of the silicon substrate 11 as shown in FIG. 7, it may be exposed to either one of the outer surface (undersurface) and the inner surface (top surface) of the silicon substrate 11, or may be formed in the middle portion in the thickness direction of the silicon substrate 11 without being exposed to the outer surface (undersurface) or inner surface (top surface) of the silicon substrate 11.

After the deteriorated layer 110 is formed along the street 101 formed in the predetermined direction in the silicon substrate 11 as described above, the chuck table 36 is moved a distance corresponding to the interval between streets 101 in the indexing-feed direction indicated by the arrow Y in FIG. 5 to carry out the above first deteriorated layer forming step again. After the above first deteriorated layer forming step is carried out along all the streets 101 formed in the predetermined direction, the chuck table 36 is turned at 90° to carry out the above first deteriorated layer forming step along streets 101 formed in a direction perpendicular to the above predetermined direction, thereby making it possible to form a deteriorated layer 110 along all the streets 101 in the inside of the silicon substrate 11.

Figure 8:
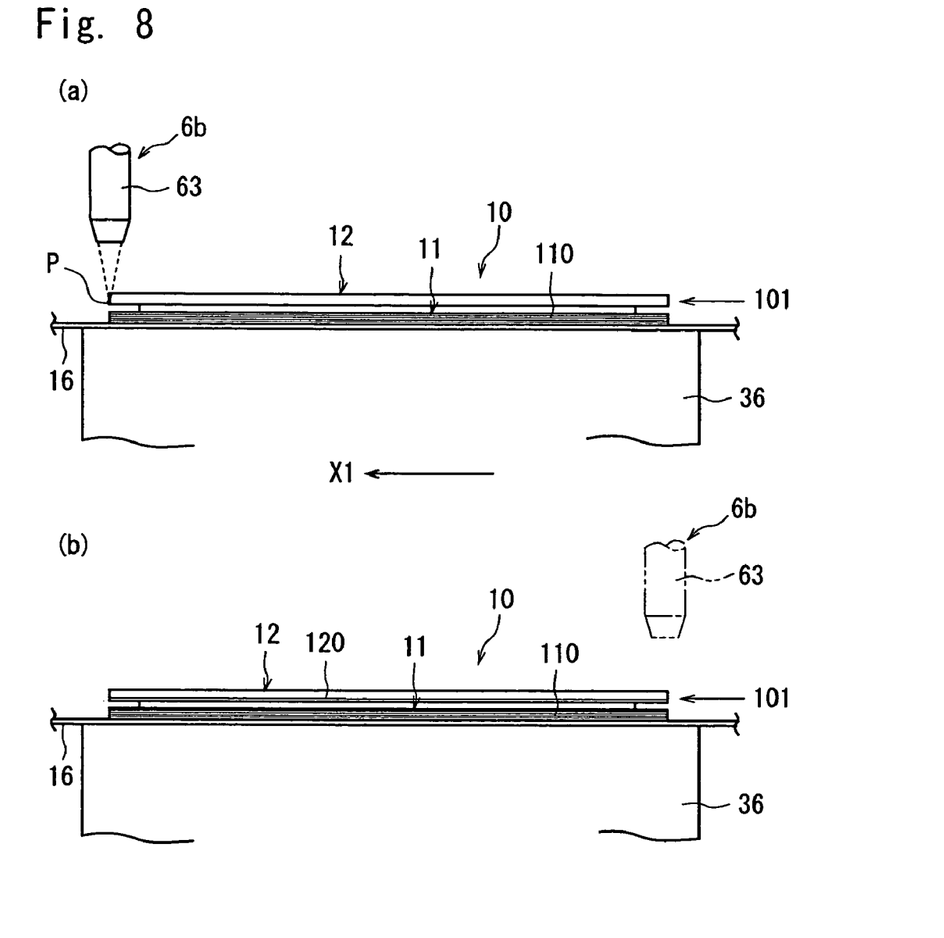
FIGS. 8(a) and 8(b) are explanatory diagrams showing the second deteriorated layer forming step in the method of laser processing a liquid crystal device wafer according to the present invention.

Next comes a second deteriorated layer forming step for forming a deteriorated layer along the streets 101 in the inside of the glass substrate 12 by applying a laser beam of a wavelength capable of passing through the glass substrate 12 and capable of forming a deteriorated layer in the inside of the glass substrate 12 along the streets 101 with its focal point set to the inside of the glass substrate 12. In this second deteriorated layer forming step, the chuck table 36 is moved to a laser beam application area where the condenser 63 of the second laser beam application means 6b for applying a pulse laser beam is located so as to bring one end (left end in FIG. 8(a)) of the predetermined street 101 to a position right below the condenser 63 of the second laser beam application means 6b, as shown in FIG. 8(a). The chuck table 36, that is, the liquid crystal device wafer 10 is then moved in the direction indicated by the arrow X1 in FIG. 8(a) at a predetermined feed rate while a pulse laser beam of a wavelength of 355 nm capable of passing through the glass substrate 12 and capable of forming a deteriorated layer in the inside of the glass substrate 12 is applied from the condenser 63 from the glass substrate 12 side. When the other end of the street 101 reaches the application position of the condenser 63 of the second laser beam application means 6b as shown in FIG. 8(b), the application of the pulse laser beam is suspended, and the movement of the chuck table 36, that is, the liquid crystal device wafer 10 is stopped. In this second deteriorated layer forming step, the focal point P of the pulse laser beam is set to a position near the inner surface (undersurface) of the glass substrate 12 so that a deteriorated layer 120 is formed from the inner surface (undersurface) toward the inside. This deteriorated layer 120 is formed as a molten and re-solidified layer.

The processing conditions in the above second deteriorated layer forming step are set as follows, for example.

Figure 9:
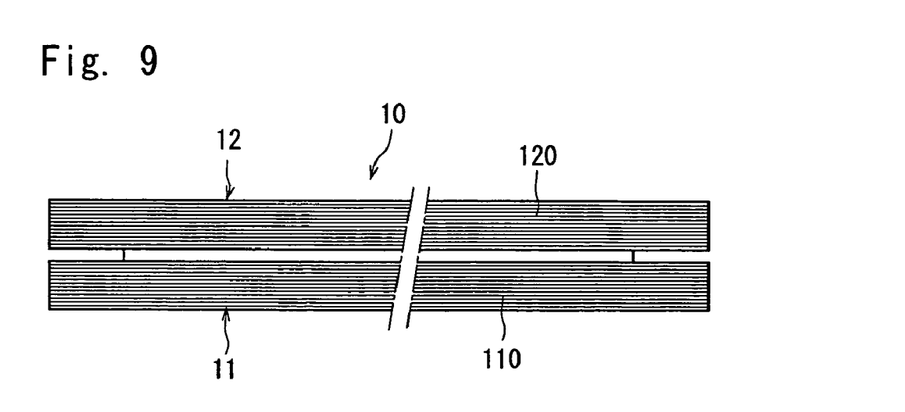
FIG. 9 is an explanatory diagram showing a first embodiment of the second deteriorated layer forming step in the method of laser processing a liquid crystal device wafer according to the present invention.

Light source: LD excited Q switch Nd:YVO4 laser
Wavelength: pulse laser beam having a wavelength of 355 nm
Repetition frequency: 30 to 100 kHz
Average output: 0.1 to 5 W
Focal spot diameter: 1 to 50 μm
Processing-feed rate: 500 to 700 mm/sec When the glass substrate 12 is thick, the above second deteriorated layer forming step is carried out a plurality of times by changing the focal point stepwise as shown in FIG. 9 to form a plurality of deteriorated layers 120. Though the deteriorated layer 120 may be formed from the inner surface to the outer surface (from the undersurface to the top surface) of the glass substrate 12 as shown in FIG. 9, it may be exposed to either one of the inner surface (undersurface) and the outer surface (top surface) of the glass substrate 12, or may be formed in the middle portion in the thickness direction of the glass substrate 12 without being exposed to the inner surface (undersurface) or outer surface (top surface) of the glass substrate 12.

After the above deteriorated layer 120 is formed along the street 101 formed in the predetermined direction in the glass substrate 12 as described above, the chuck table 36 is moved a distance corresponding to the interval between streets 101 in the indexing-feed direction indicated by the arrow Y in FIG. 5 to carry out the above second deteriorated layer forming step again. After the above second deteriorated layer forming step is carried out along all the streets 101 formed in the predetermined direction, the chuck table 36 is turned at 90° to carry out the above second deteriorated layer forming step along streets 101 formed in a direction perpendicular to the above predetermined direction, thereby making it possible to form a deteriorated layer 120 along all the streets 101 in the inside of the glass substrate 12.

In the above second deteriorated layer forming step, when the pulse laser beam is applied with its focal point set to a position near the inner surface (undersurface) of the glass substrate 12 at the time when the deteriorated layer is to be formed along a street 101 where the liquid crystal injection port 133 open to one of the end faces of the liquid crystal device 13 is formed, the transparent conductive film 134 formed on the inner surface (undersurface) of the glass substrate 12 is undergone processing and scattered by the energy of the pulse laser beam which could not be absorbed at the focal point. The liquid crystal injection port 133 may be blocked up with the scattered debris of the transparent conductive film 134. When the liquid crystal injection port 133 is blocked up, it is difficult to inject liquid crystals into the liquid crystal chamber 132 from the liquid crystal injection port 133 of the liquid crystal device 13 after the liquid crystal device wafer 10 is divided into liquid crystal devices 13. Therefore, in the above second deteriorated layer forming step, it is desirable that the deteriorated layer 120 be formed in such a manner so as not to block up the liquid crystal injection port 133 with debris of the transparent conductive film 134.

Embodiments of the second deteriorated layer forming step in which the laser beam is applied without laser processing areas where the liquid crystal injection port 133 is formed, of the transparent conductive film 134 will be described with reference to FIGS. 10 to 13.

Figure 10:
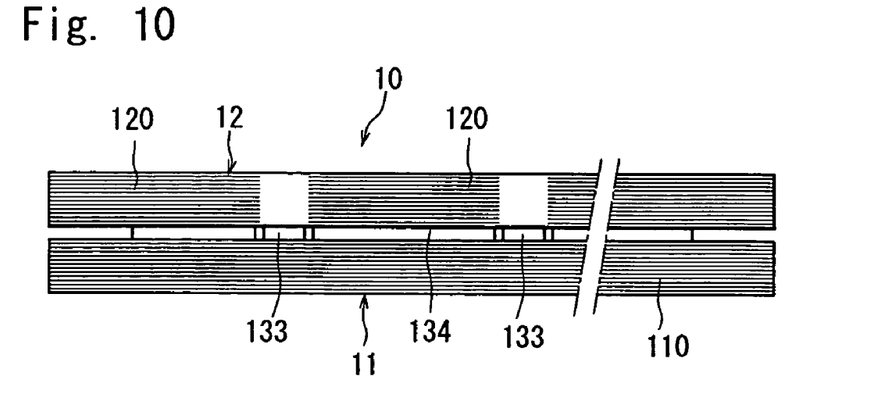
FIG. 10 is an explanatory diagram showing a second embodiment of the second deteriorated layer forming step in the method of laser processing a liquid crystal device wafer according to the present invention.

In an embodiment shown in FIG. 10, when the deteriorated layer 120 is to be formed in the glass substrate 12 in the above second deteriorated layer forming step, the application of the pulse laser beam by the second laser beam application means 6b is stopped at positions where the liquid crystal injection ports 133 are formed. As a result, as the areas at positions above the liquid crystal injection ports 133 of the transparent conductive film 134 are not laser processed, the transparent conductive film 134 is not laser processed as well, thereby preventing the liquid crystal injection ports 133 from being blocked up with debris of the transparent conductive film 134. To stop the application of the pulse laser beam by the second laser beam application means 6b at positions where the liquid crystal injection ports 133 are formed, the control means 8 of the laser beam processing machine 1 shown in FIG. 5 controls the above second laser beam application means 6b based on design data on the positions of the liquid crystal injection ports 133 of the liquid crystal device wafer 10 stored in the first storage area 83a of the random access memory (RAM) 83 and the moving position of the chuck table 36 obtained by counting pulse signals from the read head 374a of the processing-feed amount detection means 374, with the counter 84.

Figure 11:
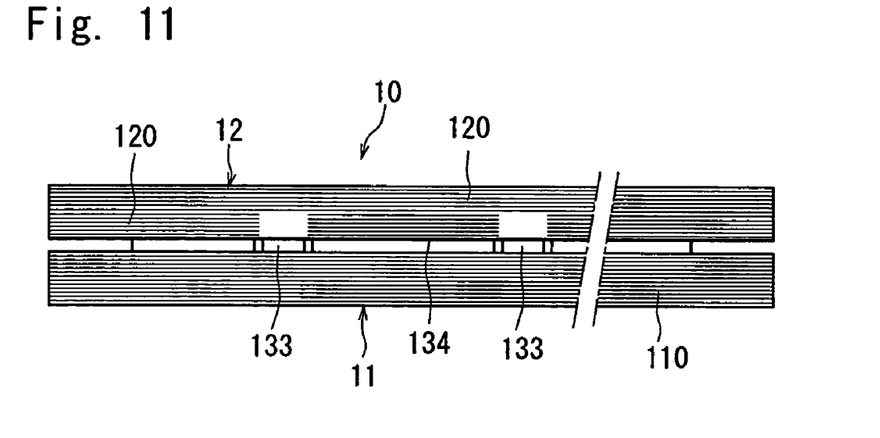
FIG. 11 is an explanatory diagram showing a third embodiment of the second deteriorated layer forming step in the method of laser processing a liquid crystal device wafer according to the present invention.

In an embodiment shown in FIG. 11, when the deteriorated layer 120 is to be formed by setting the focal point to a position near the inner surface (undersurface) of the glass substrate 12 of the liquid crystal device wafer 10, the application of the pulse laser beam by the second laser beam application means 6b is stopped at positions where the liquid crystal injection ports 133 are formed in several layers where there is the possibility of laser processing the transparent conductive film 134. The deteriorated layer 120 is then formed along the entire range of the street 101 in the area from a position where there is no possibility of laser processing the transparent conductive film 134 to the outer surface (top surface). As a result, the areas at positions above the liquid crystal injection ports 133 of the transparent conductive film 134 are not laser processed, whereby the transparent conductive film 134 is not laser processed as well, thereby preventing the liquid crystal injection ports 133 from being blocked up with debris of the transparent conductive film 134. The control of stopping the application of the pulse laser beam by the above second laser beam application means 6b at positions where the liquid crystal injection ports 133 are formed may be the same as that shown in FIG. 10.

Figure 12:
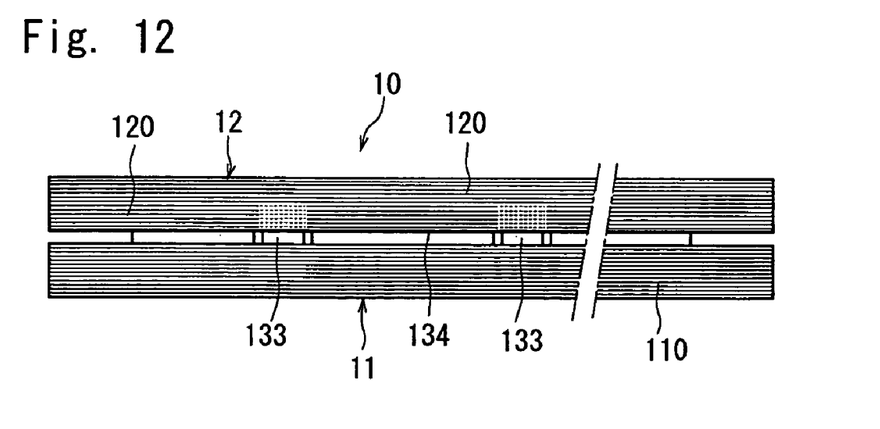
FIG. 12 is an explanatory diagram showing a fourth embodiment of the second deteriorated layer forming step in the method of laser processing a liquid crystal device wafer according to the present invention.

In an embodiment shown in FIG. 12, when the deteriorated layer 120 is to be formed by setting the focal point to a position near the inner surface (undersurface) of the glass substrate 12 of the liquid crystal device wafer 10, the output of the pulse laser beam applied from the above second laser beam application means 6b is reduced to such a small value that the transparent conductive film 134 is not processed at positions where the liquid crystal injection ports 133 are formed in several layers where there is the possibility of processing the transparent conductive film 134. As a result, the areas at positions above the liquid crystal injection ports 133 of the glass substrate 12 are slightly processed but the areas at positions above the liquid crystal injection ports 133 of the transparent conductive film 134 are not laser processed, thereby preventing the liquid crystal injection ports 133 from being blocked up with debris of the transparent conductive film 134. To reduce the output of the pulse laser beam by the above second laser beam application means 6b at positions where the liquid crystal injection ports 133 are formed, the control means 8 of the laser beam processing machine 1 shown in FIG. 5 controls the above second laser beam application means 6b based on design data on the positions of the liquid crystal injection ports 133 of the liquid crystal device wafer 10 stored in the first storage area 83a of the random access memory (RAM) 83 and the moving position of the chuck table 36 obtained by counting pulse signals from the read head 374b of the processing-feed amount detection means 374, with the counter 84 like the embodiment shown in FIG. 10.

Figure 13:
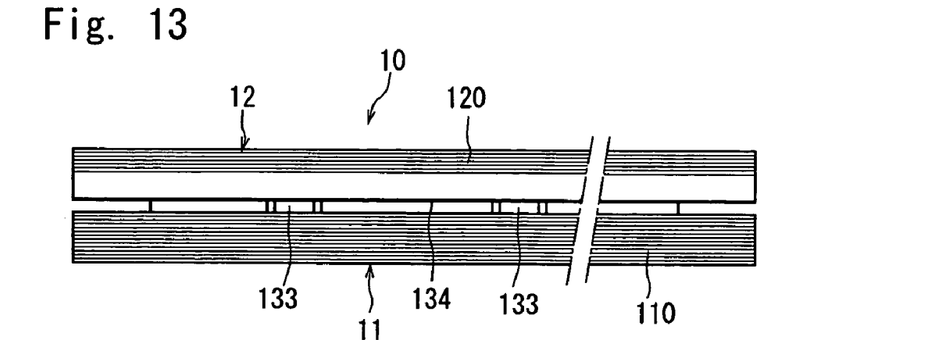
FIG. 13 is an explanatory diagram showing a fifth embodiment of the second deteriorated layer forming step in the method of laser processing a liquid crystal device wafer according to the present invention.

In an embodiment shown in FIG. 13, the deteriorated layer 120 is not formed up to a position near the inner surface (undersurface) of the glass substrate 12 of the liquid crystal device wafer 10, that is, a position where there is the possibility of processing the transparent conductive film 134, and the above second deteriorated layer forming step is carried out in the area from a position where there is no possibility of processing the transparent conductive film 134 up to the outer surface (top surface) to form the deteriorated layer 120. As a result, as the transparent conductive film 134 is not laser processed, the liquid crystal injection ports 133 are not blocked up with debris of the transparent conductive film 134.

Since the pulse laser beam is applied from the glass substrate 12 side in the first deteriorated layer forming step and the second deteriorated layer forming step as described above, the deteriorated layers can be formed along the predetermined streets 101 in the insides of the silicon substrate 11 and the glass substrate 12 efficiently without necessity of reversing the liquid crystal device wafer 10.

Figure 14:
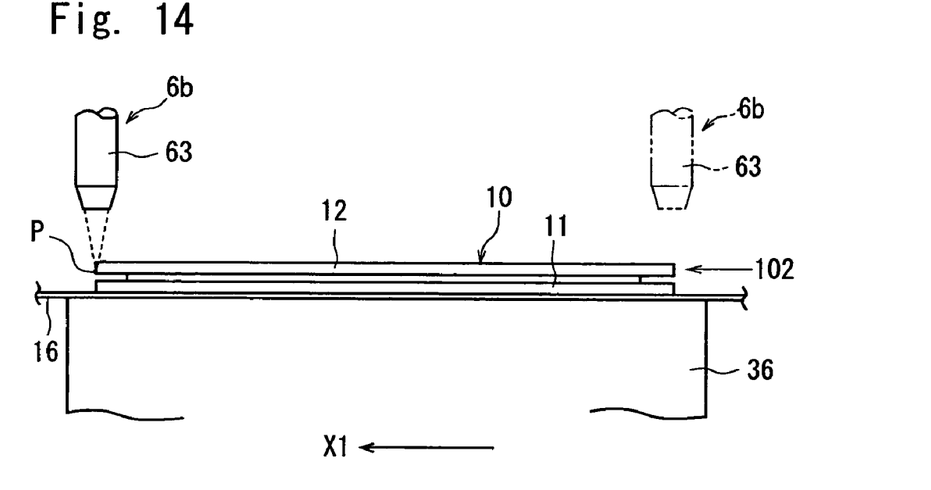
FIG. 14 is an explanatory diagram showing the third deteriorated layer forming step in the method of laser processing a liquid crystal device wafer according to the present invention.

After the above first deteriorated layer forming step and the second deteriorated layer forming step, next comes a third deteriorated layer forming step for forming a deteriorated layer in the inside of the glass substrate 12 along break lines 102 formed on the glass substrate 12. In this third deteriorated layer forming step, the chuck table 36 is moved to a laser beam application area where the condenser 63 of the second laser beam application means 6b for applying a pulse laser beam is located to bring one end (left end in FIG. 14) of a predetermined break line 102 to a position right below the condenser 63 of the second laser beam application means 6b, as shown in FIG. 14. The chuck table 36, that is, the liquid crystal device wafer 10 is then moved in the direction indicated by the arrow X1 in FIG. 14 at a predetermined feed rate while a pulse laser beam of a wavelength of 355 nm capable of passing through the glass substrate 12 and capable of forming a deteriorated layer in the inside of the glass substrate 12 is applied from the condenser 63, from the glass substrate 12 side. When the other end of the break line 102 reaches the application position of the condenser 63 of the second laser beam application means 6b, the application of the pulse laser beam is suspended, and the movement of the chuck table 36, that is, the liquid crystal device wafer 10 is stopped. At this point, when the laser beam is applied with its focal point set to a position near the inner surface (undersurface) of the glass substrate 12, there is the possibility of disconnecting the plurality of drive electrodes 135 by the energy of the laser beam not absorbed at the focal point. Therefore, in the above third deteriorated layer forming step, the laser beam must be applied in such a manner so as not break the plurality of drive electrodes 135. The processing conditions in the third deteriorated layer forming step may be the same as those of the above second deteriorated layer forming step.

Embodiments of the third deteriorated layer forming step in which the laser beam is applied without breaking the drive electrodes 135 will be described with reference to FIGS. 15 to 18.

Figure 15:
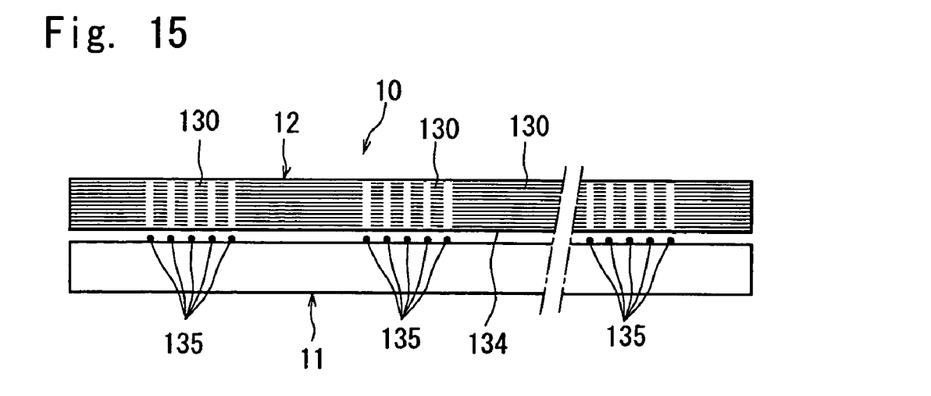
FIG. 15 is an explanatory diagram showing a first embodiment of the third deteriorated layer forming step in the method of laser processing a liquid crystal device wafer according to the present invention.

In an embodiment shown in FIG. 15, when the deteriorated layer is to be formed in the glass substrate 12 in the third deteriorated layer forming step, the application of the pulse laser beam by the above second laser beam application means 6b is stopped at positions where the drive electrodes 135 are formed. As a result, a deteriorated layer 130 is formed in the area devoid of the drive electrodes 135 of the glass substrate 12. Therefore, the drive electrodes 135 are not cut by the pulse laser beam. When a position where there is no possibility of breaking the drive electrodes 135, that is, a position above the inner surface (undersurface) of the glass substrate 12 by a predetermined distance is reached, the deteriorated layer 130 is continuously formed. To stop the application of the pulse laser beam by the second laser beam application means 6b at positions where the drive electrodes 135 are formed, the control means 8 of the laser beam processing machine 1 shown in FIG. 5 controls the above second laser beam application means 6b based on design data on the positions of the drive electrodes 135 of the liquid crystal device wafer 10 stored in the second storage area 83b of the random access memory (RAM) 83 and the moving position of the chuck table 36 obtained by counting pulse signals from the read head 374b of the processing-feed amount detection means 374, with the counter 84.

Figure 16:
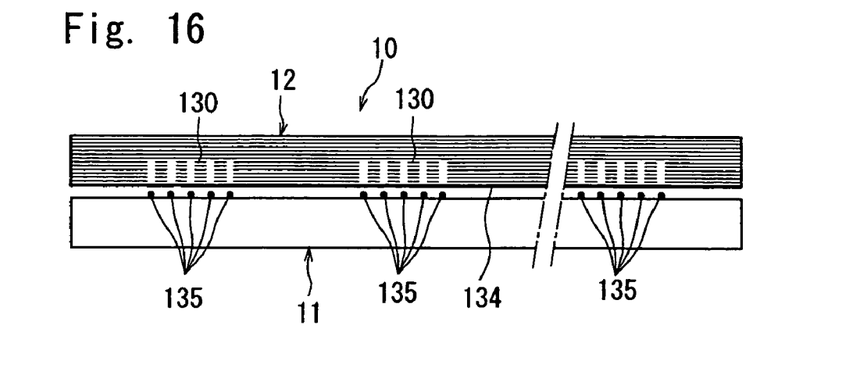
FIG. 16 is an explanatory diagram showing a second embodiment of the third deteriorated layer forming step in the method of laser processing a liquid crystal device wafer according to the present invention.

In an embodiment shown in FIG. 16, when the deteriorated layer is to be formed by setting the focal point to a position near the inner surface (undersurface) of the glass substrate 12 of the liquid crystal device wafer 10, the application of the pulse laser beam by the above second laser beam application means 6b is stopped at positions where the drive electrodes 135 are formed in several layers where there is the possibility of breaking the drive electrodes 135. The deteriorated layer 130 is then formed along the entire range of the break line 102 from a position where there is no possibility of breaking the drive electrodes 135 up to the outer surface (top surface). As a result, the deteriorated layer 130 is formed in the area devoid of the drive electrodes 135 of the glass substrate 12. Therefore, the drive electrodes 135 are not cut by the pulse laser beam. The control of stopping the application of the pulse laser beam by the second laser beam application means 6b at positions where the drive electrodes 135 are formed may be the same as that of the embodiment shown in FIG. 15.

Figure 17:
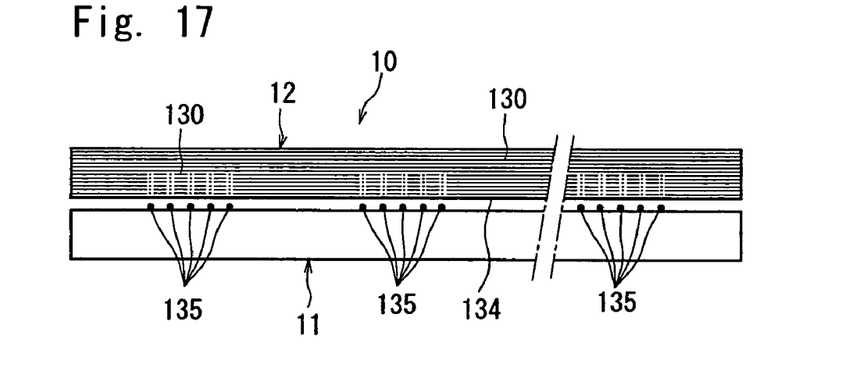
FIG. 17 is an explanatory diagram showing a third embodiment of the third deteriorated layer forming step in the method of laser processing a liquid crystal device wafer according to the present invention.

In an embodiment shown in FIG. 17, when the deteriorated layer 130 is to be formed by setting the focal point to a position near the inner surface (undersurface) of the glass substrate 12 of the liquid crystal device wafer 10, the output of the pulse laser beam applied from the above second laser beam application means 6b is reduced to such a small value that the drive electrodes 135 are not broken at positions where the drive electrodes 135 are formed in several layers where there is the possibility of breaking the drive electrodes 135. The deteriorated layer 130 is formed along the entire range of the break line 102 from a position where there is no possibility of breaking the drive electrodes 135 up to the outer surface (top surface). Therefore, the drive electrodes 135 are not broken. To reduce the output of the pulse laser beam by the above second laser beam application means 6b at positions where the drive electrodes 135 are formed, the control means 8 of the laser beam processing machine 1 shown in FIG. 5 controls the above second laser beam application means 6b based on design data on the positions of the drive electrodes 135 of the liquid crystal device wafer 10 stored in the second storage area 83b of the random access memory (RAM) 83 and the moving position of the chuck table 36 obtained by counting pulse signals from the read head 374b of the processing-feed amount detection means 374, with the counter 84.

Figure 18:
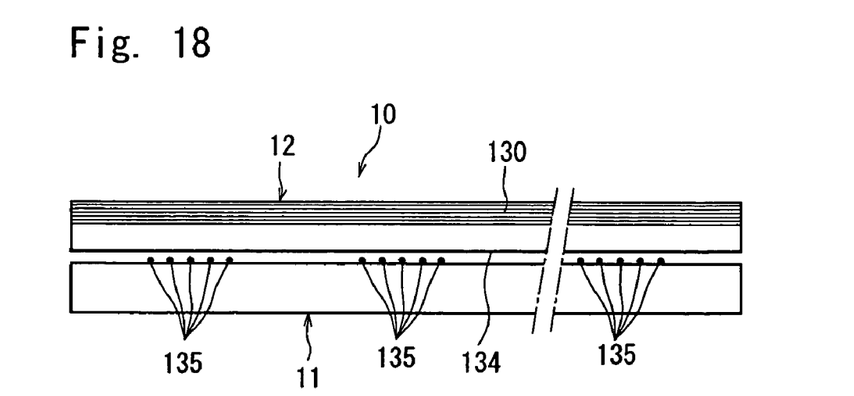
FIG. 18 is an explanatory diagram showing a fourth embodiment of the third deteriorated layer forming step in the method of laser processing a liquid crystal device wafer according to the present invention.

In an embodiment shown in FIG. 18, the deteriorated layer 130 is not formed up to a position near the inner surface (undersurface) of the glass substrate 12 of the liquid crystal device wafer 10, that is, a position where there is the possibility of breaking the drive electrodes 135, and the above third deteriorated layer forming step is carried out in the area from a position where there is no possibility of breaking the drive electrodes 135 up to the outer surface (top surface) to form the deteriorated layer 130.

Figure 19:
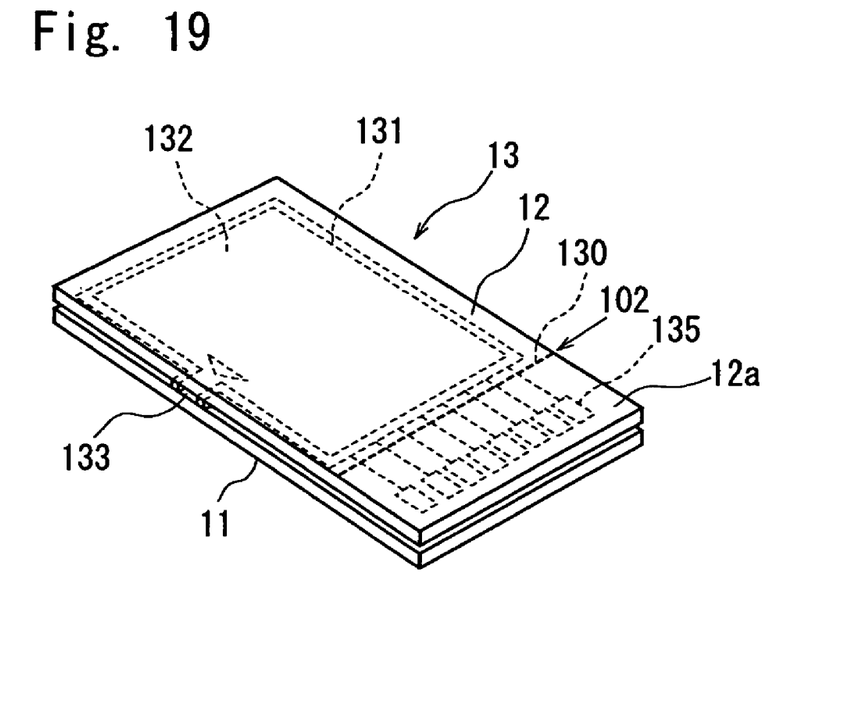
FIG. 19 is a perspective view of a liquid crystal device obtained by dividing the liquid crystal device wafer along the streets.

After the deteriorated layer 110 and the deteriorated layer 120 are formed along the streets 101 in the insides of the silicon substrate 11 and the glass substrate 12 of the liquid crystal device wafer 10 and the deteriorated layer 130 is formed along the break lines 102 in the inside of the glass substrate 12 as described above, the liquid crystal device wafer 10 held on the chuck table 36 is conveyed to the subsequent dividing step. In the dividing step, the liquid crystal device wafer 10 is divided along the streets 101 as shown in FIG. 19 by exerting external force along the streets 101 where the deteriorated layer 110 and the deteriorated layer 120 have been formed to obtain liquid crystal devices 13. In this dividing step, as the strength has been reduced by the formation of the deteriorated layer 110 and the deteriorated layer 120 along the streets 101, the liquid crystal device wafer 10 can be easily and surely divided along the streets 101 by exerting external force.

Figure 20:
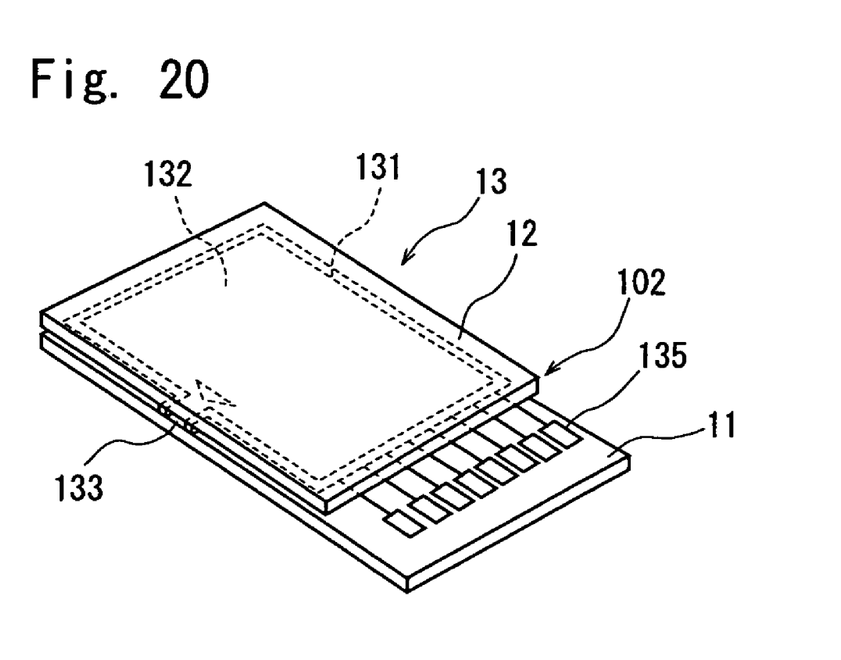
FIG. 20 is a perspective view showing a state where a glass substrate constituting the liquid crystal device shown in FIG. 19 is broken along a break line.

The glass substrate 12 of the liquid crystal device 13 divided as shown in FIG. 19 is broken along the break line 102 by exerting external force along the break line 102 whose strength has been reduced by the formation of the deteriorated layer 130 in the glass substrate 12, and a portions 12 on the upper side of the drive electrodes 135 is removed. As a result, as shown in FIG. 20, the drive electrode 135 of the liquid crystal device 13 is exposed.

What is claimed is:

1. A method of laser processing a liquid crystal device wafer which is formed by laminating together a silicon substrate and a glass substrate and has liquid crystal chambers between the silicon substrate and the glass substrate, each of which being provided with a liquid crystal injection port communicating therewith, in rectangular areas sectioned by streets arranged in a lattice pattern on one of the outer surfaces and a plurality of drive electrodes arranged adjacent to each of the liquid crystal chambers on the silicon substrate, the method comprising the steps of:

a first deteriorated layer forming step for forming a deteriorated layer along the streets in the inside of the silicon substrate by applying a laser beam of a wavelength capable of passing through the silicon substrate and forming a deteriorated layer in the inside of the silicon substrate from the glass substrate side with its focal point set to the inside of the silicon substrate; and a second deteriorated layer forming step for forming a deteriorated layer along the streets in the inside of the glass substrate by applying a laser beam of a wavelength capable of passing through the glass substrate and forming a deteriorated layer in the inside of the glass substrate with its focal point set to the inside of the glass substrate.

2. The method of laser processing a liquid crystal device wafer according to claim 1, wherein a transparent conductive film is formed on the inner surface of the glass substrate and the laser beam is applied so as not to laser process the areas where the liquid crystal injection ports are formed, of the transparent conductive film in the second deteriorated layer forming step.

3. The method of laser processing a liquid crystal device wafer according to claim 2, wherein the application of the laser beam is stopped at positions where the liquid crystal injection ports are formed in the second deteriorated layer forming step.

4. The method of laser processing a liquid crystal device wafer according to claim 2, wherein a plurality of deteriorated layers are formed in the thickness direction of the glass substrate and the application of the laser beam is stopped at positions where the liquid crystal injection ports are formed when the deteriorated layers are to be formed at positions near the liquid crystal injection ports in the second deteriorated layer forming step.

5. The method of laser processing a liquid crystal device wafer according to claim 2, wherein the output of the laser beam is reduced at positions where the liquid crystal injection ports are formed in the second deteriorated layer forming step.

6. The method of laser processing a liquid crystal device wafer according to claim 1, wherein a break line for breaking a portion corresponding to the plurality of drive electrodes is formed on the outer surface of the glass substrate, and a third deteriorated layer forming step is carried out to form a deteriorated layer along the break line in the inside of the glass substrate by applying a laser beam of a wavelength capable of passing through the glass substrate and forming a deteriorated layer in the inside of the glass substrate along the break line with its focal point set to the inside of the glass substrate.

7. The method of laser processing a liquid crystal device wafer according to claim 6, wherein the laser beam is applied so as not to break the plurality of drive electrodes in the third deteriorated layer forming step.

8. The method of laser processing a liquid crystal device wafer according to claim 7, wherein the application of the laser beam is stopped at positions where the plurality of drive electrodes are formed in the third deteriorated layer forming step.

9. The method of laser processing a liquid crystal device wafer according to claim 7, wherein a plurality of deteriorated layers are formed in the thickness direction of the glass substrate and the application of the laser beam is stopped at positions where the plurality of drive electrodes are formed when the deteriorated layers are to be formed at positions near the plurality of drive electrodes in the third deteriorated layer forming step.

10. The method of laser processing a liquid crystal device wafer according to claim 7, wherein the output of the laser beam is reduced at positions where the plurality of drive electrodes are formed in the third deteriorated layer forming step.

* * * * *